United States Patent [19]

Schopper et al.

[11] 4,361,361
[45] Nov. 30, 1982

[54] DUAL-CIRCUIT PRESSURE CONTROL VALVE FOR HYDRAULIC BRAKE SYSTEMS

[75] Inventors: Bernd Schopper, Hattersheim; Peter Tandler, Falkenstein, both of Fed. Rep. of Germany

[73] Assignee: ITT Industries, Inc., New York, N.Y.

[21] Appl. No.: 253,122

[22] Filed: Apr. 10, 1981

[30] Foreign Application Priority Data

May 9, 1980 [DE] Fed. Rep. of Germany ....... 3017728

[51] Int. Cl.³ .............................................. B60T 8/02
[52] U.S. Cl. ..................................... 303/6 C; 188/349
[58] Field of Search ............ 303/6 C, 6 R, 6 A, 22 B, 303/22 A, 23 R, 23 A, 52, 24, 84; 188/349, 195

[56] References Cited

U.S. PATENT DOCUMENTS

| | | | |
|---|---|---|---|
| 3,840,280 | 10/1974 | Watanabe | 303/22 R |
| 3,932,002 | 1/1976 | Komoda et al. | 303/22 R |
| 4,093,314 | 6/1978 | Kuzakai | 303/24 F |
| 4,203,627 | 5/1980 | Kono | 303/6 C |

FOREIGN PATENT DOCUMENTS 1114102 8/1956 Fed. Rep. of Germany ..... 303/6 R
2748699 5/1978 Fed. Rep. of Germany .

*Primary Examiner*—Douglas C. Butler
*Attorney, Agent, or Firm*—John T. O'Halloran; Alfred C. Hill

[57] ABSTRACT

In a dual-circuit pressure control valve for hydraulic brake systems, the control pistons disposed parallel to one another are each loaded by a first arm of an associated angular lever. Each of the levers have a second arm perpendicular to the first arm acted upon by a common tension spring disposed therebetween. The levers are located approximately in a plane defined by the axes of the control pistons. The tilting axes of the levers are disposed perpendicular to this plane and are disposed outside the axes of the control pistons. This results in a short overall length in both the axial and radial direction. In addition, a carrier device is provided which couples one of the control pistons with the lever of the other control piston after a small relative movement of the control pistons. This carrier device becomes effective upon failure of one brake circuit. The carrier device may be formed by extensions of the first arms which overlap one another with play.

3 Claims, 1 Drawing Figure

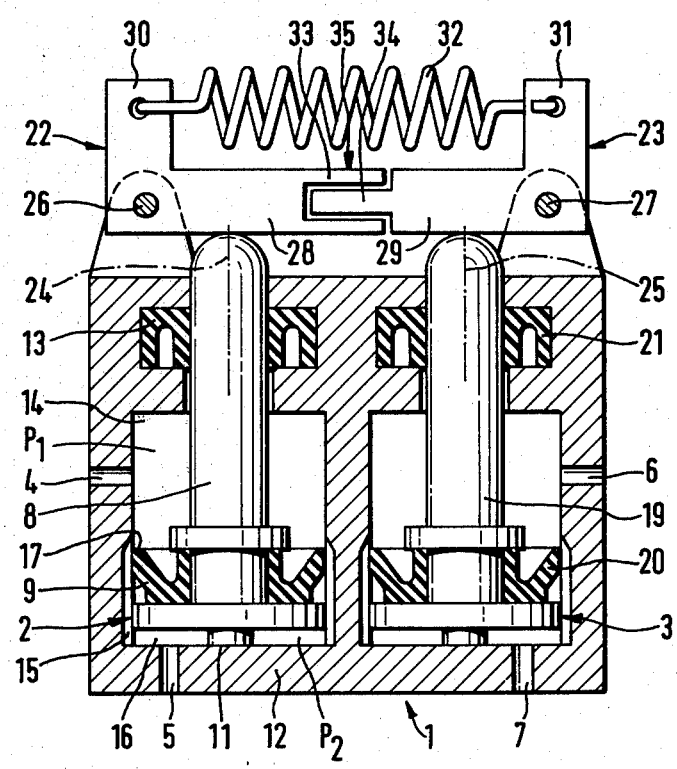

DUAL-CIRCUIT PRESSURE CONTROL VALVE FOR HYDRAULIC BRAKE SYSTEMS

BACKGROUND OF THE INVENTION

The present invention relates to a dual-circuit pressure control valve for hydraulic brake systems having two control pistons arranged in parallel side by side relationship each assigned to a different one of two brake circuits, the preloading force of the control pistons being generated by a common spring.

There are known pressure control valves of this type, for example, as disclosed in German Patent DE-OS 2,748,699 in which a common helical spring acts via a distribution element on the end surfaces of both control pistons for the generation of the preloading forces. In this arrangement, a correspondingly large space is required in the axial direction for the distribution element and the helical spring.

There are other known dual-circuit pressure control valves, for example, as disclosed in U.S. Pat. No. 4,093,314 in which each control piston is loaded by a spring of its own. In addition, there are two angular levers provided at least approximately in the plane defined by the axes of the control pistons. The angular levers are each tiltable around one of two axes extending perpendicular to this plane and located between the axes of the control pistons. The angular levers include first arms remote from one another acting on a pin, against which pin a control piston spring bears, and second arms extending transversely relative to the first arms each bearing a weight and being pressed apart by a compression spring. This construction requires considerable space - not only in the axial direction, but also in the radial direction.

SUMMARY OF THE INVENTION

An object of the present invention is to provide a pressure control valve of the type referred to hereinabove having small dimensions not only in the radial direction, but also in the axial direction.

A feature of the present invention is the provision of a dual-circuit pressure control valve for a hydraulic brake system comprising two control pistons disposed in parallel side by side relationship, each of the two pistons being assigned to a different brake circuit; two angular levers disposed at least approximately in a plane defined by longitudinal axes of the two pistons, each of the two levers being tiltable around a different one of two tilting axes disposed perpendicular to the plane and disposed outside the axes of the two pistons, each of the two levers including a first arm disposed adjacent each other acting upon an associated one of the two pistons and a second arm disposed perpendicular to the first arm adjacent an associated one of the two tilting axes; and a common tension spring disposed between the two second arms to generate a preloading force for the two pistons.

In this construction, the total force is transmitted onto each control piston - not only half of the force as is the case with the known common helical spring and distribution element arrangement. As a result, a smaller spring can be used. Besides, it is particularly important that both pistons are always automatically subjected to the same force, since an increase of the force on one piston leads to an increase of force on the other piston. By appropriate selection of the length of the lever arms, it is possible to realize any transmission ratio desired, which may be likewise utilized for reducing the size of the spring. Since the axis of the spring extends approximately perpendicular to the axes of the two control pistons, the axial dimension in direction of the control pistons may be kept small. In addition to this, the control pistons are allowed to be comparatively closely neighboring each other, and the axes of the angular levers do not need to extend any great distance outside the axes of the pair of control pistons. For this reason, the radial dimensions may also be kept small.

A carrier device is provided which couples the leading control piston with the angular lever assigned to the other control piston after a slight relative movement of the leading control piston. This way, it is ensured that upon failure of one brake circuit, the other brake circuit will be stressed additionally resulting in its braking effect being increased.

In particular, the carrier device may be formed by extensions of the first arms, the extensions over lapping each other with play with one of the extensions being constructed fork-like.

BRIEF DESCRIPTION OF THE DRAWING

The above mentioned and other objects and features of the present invention and the manner of obtaining them will become more apparent by reference to the following description taken in conjunction with the drawing, the single FIGURE of which is a partial longitudinal cross-sectional view of a dual-circuit pressure control valve in accordance with the principles of the present invention.

DESCRIPTION OF THE PREFERRED EMBODIMENT

Accommodated in a schematically illustrated housing 1 are two pressure control valves 2 and 3 each controlling the pressure in a different one of two brake circuits. Pressure control valve 2 is provided with an inlet 4 and an outlet 5 and pressure control valve 3 is provided with an inlet 6 and an outlet 7. For example, inlets 4 and 6 are each connected with a different outlet pressure chamber of a tandem master cylinder actuatable by a brake pedal, while outlets 5 and 7 are each connected to a different one of two brake circuits each connected to a different one of a rear wheel cylinder of an automotive vehicle.

Pressure control valve 2 has a control piston 8 carrying a sealing sleeve 9 and is pressed downwards with a specific preload so that its lower end face 11 will move into abutment with the housing bottom 12 in the rest position. Control piston 8 is sealed by means of a seal 13 relative to the outside of housing 1. In the rest position illustrated, inlet chamber 14 communicates with outlet chamber 16 via paraxial grooves 15. If, however, control piston 8 moves upwardly with rising pressure on account of its different pressure actuated surfaces and the rim 17 of sealing sleeve 9 thereby overrides the end of grooves 15, inlet chamber 14 and outlet chamber 16 will be separated from each other, so that with the inlet pressure $P_1$ continuing to rise, the outlet pressure $P_2$ will rise more slowly determined by the ratio of the pressure actuated surfaces of piston 8.

Similarly, pressure control valve 3 has a control piston 19 with a sealing sleeve 20. It is also sealed relative to the outside of housing 1 by a seal 21.

Two angular levers 22 and 23 are arranged in a plane which corresponds approximately to the plane defined by the axes 24 and 25 of control pistons 8 and 19. Angular levers 22 and 23 are tiltable around the axes 26 and 27 extending perpendicular relative to the above-mentioned plane. Each of axes 26 and 27 are disposed outside of the pair of axes 24 and 25. Angular levers 22 and 23 have first arms 28 and 29, respectively, close to one another acting on the adjacent end surfaces of control pistons 8 and 19, respectively. Angular levers 22 and 23 include second arms 30 and 31 extending perpendicular with respect to first arms 28 and 29, respectively, and are interconnected by a tension spring 32 which serves as a common preloading spring.

Acting upon each of control valves 2 and 3 in this arrangement, is a preloading force which is equal to the preloading force of tension spring 32 multiplied by the transmission ratio of angular levers 22 and 23. This provides a definition of the change-over point at which sealing sleeves 9 and 20 close the connection to the outlet chambers.

First arm 28 has a fork-like extension 33 and first arm 29 has an extension 34 extending between the tines of fork-like extension 33. Both of extensions 33 and 34 together form a carrier device 35 being activated upon failure of one of the brake circuits governed by the pressure control valves. The two extensions 33 and 34 have in both directions a distance separating each other which is smaller than the value closure travel, but which allows a certain relative movement between control pistons 8 and 19. If, for example, the brake circuit assigned to control piston 19 is depressurized, only control piston 8 will be pressed upwardly. Fork-like extension 33 will drive extension 34 after a slight relative movement. In this way, control piston 8 is loaded with a higher preloading force than in normal operation so that the changing over will either not take place at all, or will take place at a considerably higher pressure value.

The carrier device may also be of different construction. For example, a carrier bridge can interconnect the two ends of control pistons 8 and 19 projecting from housing 1, the carrier bridge allowing a certain clearance between these pistons, be it by means of a lost motion clutch, or by a limited flexibility of the bridge.

The dual-circuit pressure control valve illustrated may also have other control functions. For instance, the function of a lock valve keeping the outlet pressure at a constant level in the event of rising inlet pressure above the change-over point.

While we have described above the principles of our invention in connection with specific apparatus it is to be clearly understood that this description is made only by way of example and not as a limitation to the scope of our invention as set forth in the objects thereof and in the accompanying claims.

We claim:

1. A dual-circuit pressure control valve for a hydraulic brake system comprising:
   two control pistons disposed in parallel side by side relationship, each of said two pistons having a longitudinal axis and being assigned to a different brake circuit;
   two angular levers disposed at least approximately in a plane defined by said longitudinal axes of said two pistons, each of said two levers being tiltable around a different one of two tilting axes disposed perpendicular to said plane and disposed outside said longitudinal axes of said two pistons, each of said two levers including a first arm disposed adjacent each other acting directly upon an associated one of said two pistons and a second arm disposed perpendicular to said first arm adjacent an associated one of said two tilting axes; and
   only a common tension spring disposed between said two second arms to generate a preloading force for said two pistons.

2. A control valve according to claim 1, further including
   a carrier device disposed between said two levers to couple said two levers together after a slight relative movement of said two pistons.

3. A control valve according to claim 2, wherein
said carrier device includes
   a fork-like extension having two spaced tines of one of said first arms, and an extension of the other of said first arms disposed between said two tines of said fork-like extension with a predetermined play therebetween.

* * * * *